United States Patent

Freytag et al.

[15] 3,661,549

[45] May 9, 1972

[54] USE OF ETHYLENE FOR INCREASING CROP YIELDS

[72] Inventors: Arthur H. Freytag, Gurnee; Emil P. Lira, Des Plaines, both of Ill.

[73] Assignee: International Minerals & Chemical Corporation

[22] Filed: Apr. 30, 1969

[21] Appl. No.: 820,651

[52] U.S. Cl. .......................................... 71/1, 71/27, 71/127
[51] Int. Cl. .......................................... A01n 9/40, C05f 11/00
[58] Field of Search .................. 71/1, 11, 27, 127; 47/58

[56] References Cited

UNITED STATES PATENTS

| | | | |
|---|---|---|---|
| 2,047,874 | 7/1936 | Kerns | 71/127 |
| 2,084,461 | 6/1937 | Sonker et al | 71/127 |
| 2,242,429 | 5/1941 | Johnson | 71/127 |
| 2,245,867 | 6/1941 | Mehrlich | 71/127 |
| 2,512,044 | 6/1950 | Swaney | 71/127 |
| 2,912,793 | 11/1959 | Stone et al. | 71/1 X |
| 3,184,891 | 5/1965 | Frantzen | 71/1 X |
| 3,234,028 | 2/1966 | Dunham et al | 71/127 X |
| 3,274,730 | 9/1966 | Bose | 47/17 X |
| 3,307,932 | 3/1967 | Guyot | 171/127 X |
| 3,359,092 | 12/1967 | Dunham et al | 71/127 X |
| 2,285,932 | 6/1942 | Leavitt | 71/1 X |
| 3,174,844 | 3/1965 | Bridger et al. | 71/1 X |
| 3,539,325 | 11/1970 | Young et al. | 71/1 |

OTHER PUBLICATIONS

Report to Readers, Agricultural Engineering, 9–1968
Technology, C & EW, 12-4-67

*Primary Examiner*—Reuben Friedman
*Assistant Examiner*—Richard Barnes
*Attorney*—James E. Wolber and Peter Andress

[57] ABSTRACT

Yields of crops such as soybeans and corn are increased by introducing an effective amount of ethylene into the soil near the roots of the growing plants.

12 Claims, No Drawings

USE OF ETHYLENE FOR INCREASING CROP YIELDS

BACKGROUND OF THE INVENTION

Considerable research has been conducted to find chemical agents which can be beneficially utilized as plant growth regulators, as for example, plant dwarfing agents that are useful for increasing the yields of various crops. Most of this research has been directed to chemical agents that are liquids or solids at ambient temperatures and, accordingly, can be applied in a dust, emulsion, solution, or the like.

Ammonia is one normally gaseous material which has been found to be agronomically useful. Liquid anhydrous ammonia is employed as a fertilizer by being "knifed" into the soil near the roots of plants growing as a row crop to serve as a source of nitrogen for the plants.

Propane, or liquified petroleum (LP), gas has recently received some attention as possibly being agronomically useful. Some researchers have found that the introduction of propane into the soil near corn and soybean plants resulted in increased yields. Several theories are advanced for this alleged effectiveness of propane as a plant growth regulator. One theory is that the propane increases the activity of nitrogen-fixing bacteria in the soil so as to make more nitrogen available to the plants.

Ethylene is another gaseous material which has received attention for a number of years as a potentially useful plant growth regulator. For example, ethylene and acetylene are described in U.S. Pat. No. 2,047,874 as being useful in either gaseous form or in an aqueous solution for causing pineapple and other plants to flower and mature sooner than they would otherwise. U.S. Pat. No. 2,084,461 is directed to the use of ethylene gas, or another unsaturated hydrocarbon gas such as butylene or propylene, for inducing uniformity of blooming and fruit production in fruiting plants, especially fruit trees. Although some of the findings of the effects of treating plants with ethylene are interesting from a scientific point of view, they have not met with any substantial commercial success.

SUMMARY OF THE INVENTION

This invention is based on the discovery that the introduction of an unsaturated hydrocarbon gas such as ethylene into soil, substantially below the surface and near the roots of growing plants, produces remarkably novel and unexpected plant growth regulatory effects which are of significant commercial importance. The unsaturated hydrocarbon is introduced into the soil sufficiently near the plants, i.e., the roots thereof, so that it diffuses in the soil to the plants. For example, it has been found that yields of crops obtained from plants such as soybean and corn are increased by introducing an effective, i.e., yield-enhancing, amount of ethylene into the soil in the vicinity of the roots of the plants at an optimum stage of growth of the plants.

The growth of plants growing as a row crop is regulated in accordance with the method of this invention by introducing ethylene into the soil at a distance of from about 0 to about 24 inches from the crop row and at a depth of from about 2 to about 36 inches in the soil, the ethylene being introduced in an amount of from about 0.25 to about 4 pounds per acre per application.

DESCRIPTION OF THE PREFERRED EMBODIMENTS

Crops susceptible to treatment in accordance with the method of this invention include monocotyledons such as corn, sorghum, wheat, oats, barley, rye, sugar cane and pineapple, and dicotyledons such as cotton, peanuts, tobacco, tomato, sugar beets, fruit trees, edible beans, edible peas and soybeans, particularly soybeans of the Northern or indeterminate type.

The depth beneath the ground surface and the distance from the crop row at which the ethylene is introduced will depend upon several factors, as for example, the type of soil, the moisture content of the soil, the type of plant being treated, and the like. The depth at which the ethylene is introduced will generally vary from about 2 to about 36 inches below the surface of the soil, with depths of from about 4 to about 24 inches being preferred and from about 6 to about 10 inches being most preferred. The ethylene will generally be introduced from about 0 to about 24 inches, preferably from about 8 to about 20 inches, from the crop row, i.e., the center of the row.

The ethylene is introduced in an amount sufficient to increase the crop yield. The quantity of ethylene introduced into the soil in accordance with this invention will depend upon factors such as the specific type of plant being treated, the general condition of the soil such as its type and moisture content, etc. The ethylene is generally introduced in an amount sufficient to provide in a single application from about 0.25 to about 4.0 pounds of ethylene per acre, with from about 1.0 to about 2.5 pounds per acre being preferred. Two or more applications of ethylene may be made in accordance with this invention. If more than one application is made, the total quantity of ethylene used in the plurality of applications will preferably be in the range of from about 0.25 to about 11, more preferably from about 1 to about 6, pounds per acre.

The introduction of a yield-increasing amount of ethylene into the soil near the roots of the plant will generally cause a small reduction in the growth of the plant. The reduction in plant height will increase as the quantity of ethylene introduced increases, whether in one or more than one application. It will naturally be undesirable to employ such a high amount of ethylene that the general growth of the plant is retarded to the point that the plant is no longer vigorous and healthy.

Another factor upon which the success of the method of the instant invention depends is the stage of growth of the specific type of plant being treated in accordance with this invention. This will naturally vary according to the plant with which the ethylene is utilized. As for example, if the ethylene is used to increase the yield of corn, it is preferably introduced into the soil during the stage of growth ranging from about the sixth to about the 12th leaf stage, more preferably from about the seventh to about the 10th leaf stage. However, the ethylene is applied to soybean plants in a yield-enhancing amount when the plants have two or more trifoliate leaves expanded up to the period when substantially all of the plants are flowering. The optimum growth stage for using ethylene in connection with soybeans is when the plants have from four to six trifoliate leaves expanded.

Although this invention is described as introducing gaseous ethylene into the soil in the vicinity of plant roots, other obvious means for carrying out the invention will readily be understood by those skilled in the art. Thus, aqueous solutions of ethylene and compounds which yield the desired quantity of ethylene through contact with the ground may similarly be used. Such compounds include solid and liquid materials such as N-amino-β-alanine,β-hydroxyethylhydrazine, sodium monoethylsulfate, methionine, and β-chloroethylphosphonic acid (or the ethyl ester thereof). Other unsaturated hydrocarbon gases such as propylene and butylene may also be used. However, it is necessary to use a substantially greater quantity of these olefins than ethylene, as for example, about 150 to 200 pounds per acre of propylene and about 1,000 to 2,000 pounds per acre of butylene per application. However, this invention is preferably carried out by injection of gaseous ethylene into the soil for reasons of cost, effectiveness, ease of application, and the like.

Apparatus suitable for carrying out the method of this invention will readily be apparent to one skilled in the art. As illustrative of such apparatus, it may be a cultivator equipped with a pressurized cylinder of ethylene which is connected through a flowmeter and a flow-regulating valve to a manifold. The manifold is connected to a plurality of conduits, each of which is rigidly mounted on the rear of a tool-shank and has an outlet orifice located behind a cultivator shoe affixed to the tool-shank. The flow-regulating valve is adjusted while observing the flowmeter so as to provide the desired rate of flow to the manifold and then to the respective orifices so as to introduce the desired amount of ethylene into the soil through each orifice, depending upon the speed at which the cultivator is pulled. It will be obvious that various other arrangements of apparatus may likewise be used to carry out the method of this invention. Another arrangement is the apparatus which is utilized for "knifing" ammonia into the soil.

Following the treatment with the ethylene, the plants are permitted to continue to grow until the crop is mature for harvest, and the crop is then harvested. Weed and insect control are maintained in the usual manner during the growth of the plants.

The following non-limiting specific examples will serve to further illustrate the method of this invention:

EXAMPLE I

The Harosoy variety of soybeans (a Northern variety) was planted in 100-foot rows which were 20 inches apart. One 100-foot row was considered a treatment. The treatments consisted of introducing ethylene in a given amount into the soil on either one side of a row of soybeans, or on both sides of the row.

A cultivator with four shoes about 2¼ inches wide was utilized for introducing the ethylene into the soil such that four rows of soybeans were treated with one pass of the cultivator. A cylinder of pressurized ethylene was connected through a flow-regulating valve, flowmeter and manifold to conduits terminating in orifices behind respective cultivator shoes. The cultivator shoes were mounted on tool-shanks so that the ethylene was introduced through the orifice about 7 to 8 inches below the surface of the soil. The tool-shanks were positioned so that during the pass of the cultivator the middle two shoes, and respective orifices, were between the two inner rows of the four rows of soybeans and each of the other shoes, and respective orifices, was between one inner row and outer row of soybeans. Therefore, during the one pass of the cultivator, the ethylene was introduced on both sides of each of the two innermost rows of the four rows and on one side of each of the two outermost rows. The distance between the points of ethylene introduction and the inner plant rows was about 8 inches. The two inner rows are referred to below as receiving ethylene applications on two sides, while the two outer of the four rows are referred to as receiving a treatment on only one side.

The first treatment was applied when the soybeans had grown to the fourth trifoliate stage of growth. The second application was applied to those rows receiving more than one application when the plants had grown to the fifth trifoliate stage of growth. A third application was applied to those rows receiving more than two applications when the plants had reached the sixth trifoliate stage of growth. The fourth and last application was made at the eighth trifoliate stage of growth to those rows receiving the maximum of four applications. For each of the applications, the cultivator was pulled by a tractor at a speed of 1¼ miles per hour and the flow of ethylene to the manifold was regulated at 20 liters per 100 feet. The soil cover was rapid after passage of the cultivator shoes, and there was no detectable odor of ethylene present at ground level.

The results obtained in this experiment are shown below in Table I.

TABLE I

| Treatment | | Yield, bu./Acre | % Increase |
|---|---|---|---|
| Control | | 34.0 | — |
| 1 Side | (One Application) | 37.0 | +9.0 |
| 1 Side | (Two Applications) | 37.4 | +10.0 |
| 1 Side | (Three Applications) | 37.4 | +10.0 |
| 1 Side | (Four Applications) | 37.5 | +10.0 |
| 2 Sides | (One Application) | 32.5 | −4.0 |
| 2 Sides | (Two Applications) | 32.0 | −6.0 |
| 2 Sides | (Three Applications) | 28.0 | −18.0 |
| 2 Sides | (Four Applications) | 26.0 | −23.0 |

In referring to Table I, it will be noted that a yield increase of 3.0 bushels per acre was obtained by a single application of ethylene to one side of the growing soybean plants. This represented an increase of 9.0 percent over the control. However, the increase for two, three and four applications of ethylene to only one side of the soybean plants was only 10 percent. Thus, this experiment shows that there was only a slight advantage in utilizing more than one application of ethylene, with no additional advantage having been obtained by using more than two ethylene treatments.

The detrimental effect of using an excessive amount of ethylene will be observed from the data obtained by applying the ethylene to two sides of the plant. The use of an excess of ethylene in a single application resulted in a yield decrease, with the degree of yield decrease increasing as the number of ethylene applications increased.

EXAMPLE II

This experiment demonstrates the usefulness of the method of this invention for increasing the yield of corn. In this experiment, DeKalb XL-325 variety of corn was planted in rows which were 100 feet long and 30 inches apart. Each row was considered a treatment and contained 88 plants.

The cultivator utilized in the experiment outlined in Example I was adjusted to introduce the ethylene about 8 inches below the surface of the soil on two sides of each of two innermost rows of the four rows treated with one pass. The distance between the points of ethylene introduction and the inner plant rows was about 12 inches.

The first treatment was made when the corn was at the eighth leaf stage. A second application was made 4 days later, which was while the corn was still at the eighth leaf stage. The third application was made still 4 days later when the corn was at the 10th leaf stage. The cultivator was again pulled at a speed of 1¼ miles per hour, while the ethylene flow to the manifold was maintained at 24 liters per 100 feet.

The results obtained in this experiment are outlined in Table II below.

TABLE II

| Treatment | | Yield, bu./Acre | % Increase |
|---|---|---|---|
| Control | | 113.0 | — |
| Cultivated Control | | 124.0 | +10.0 |
| 1 Side | (Two Applications) | 134.0 | +19.0 |
| 1 Side | (Three Applications) | 130.0 | +15.0 |
| 2 Sides | (Two Applications) | 122.0 | +8.0 |
| 2 Sides | (Three Applications) | 117.0 | +4.0 |

In reviewing the data of Table II it will be noted that there were yield increases of 19 and 15 percent over control when the ethylene was applied to one side of the corn two and three times, respectively. Yield increases of 8 and 4 percent were obtained when the ethylene was applied on both sides of the growing corn two and three times, respectively. However, these latter increases are lower than the increases obtained by the cultivated control, which consisted of cultivating the corn two times without introducing any ethylene into the soil.

Although this invention has been described in relation to specific embodiments, it will be obvious that modifications may be made by one skilled in the art without departing from the intended scope of the invention as defined by the appended claims. For example, it will be evident that the ethylene may be introduced into the soil in combination with a plant nutrient. As illustrative of such combinations, the ethylene may be used in combination with ammonia by introducing into the soil a mixture of gaseous ethylene and ammonia or an aqueous solution of ethylene and ammonia. Also, the solid ethylene-releasing compounds hereinbefore mentioned may be introduced into the soil in admixture with a conventional granular fertilizer. Still other alternative embodiments will be obvious.

We claim:

1. The method of treating growing plants of the group consisting of corn, soybean, cotton and sorghum to increase the crop yield therefrom which comprises introducing ethylene gas into the soil substantially below the surface of the soil and sufficiently near the roots of said plants that a yield-increasing amount of said ethylene gas diffuses in the soil to said plants, the amount of said ethylene gas being introduced into the soil in an application being in the range of from about 0.25 to about 4 pounds per acre, with the provision that the total amount of said ethylene gas introduced does not exceed 11 pounds per acre when a plurality of applications of said ethylene gas are made.

2. The method in accordance with claim 1 wherein said plants are growing as a row crop and said ethylene gas is introduced into the soil at a distance of from about 0 to about 24 inches from the crop row and at a depth of from about 2 to about 36 inches.

3. The method in accordance with claim 2 wherein said ethylene gas is introduced in a single application in an amount of from about 0.25 to about 4.0 pounds per acre and at a depth of from about 4 to about 24 inches.

4. The method in accordance with claim 3 wherein said ethylene gas is introduced in a single application in an amount of from about 1.0 to about 2.5 pounds per acre per application, at a distance of from about 8 to about 20 inches from the crop row, and at a depth of from about 6 to about 10 inches.

5. The method in accordance with claim 2 wherein said ethylene gas is introduced in a plurality of applications in a total amount of from about 0.25 to about 11 pounds per acre and at a depth of from about 4 to about 24 inches.

6. The method in accordance with claim 5 wherein said ethylene gas is introduced in a plurality of applications in a total amount of from about 1 to about 6 pounds per acre, at a distance of from about 8 to about 20 inches from the crop row and at a depth of from about 6 to about 10 inches.

7. The method in accordance with claim 2 wherein said crop is soybeans and said ethylene is introduced at the stage of growth ranging from when said plants have at least two trifoliate leaves expanded to when substantially all of said plants are flowering.

8. The method in accordance with claim 7 wherein said ethylene is introduced into the soil at a distance of from about 8 to about 20 inches from the crop row and at a depth of from about 6 to about 10 inches, said ethylene being introduced in an amount of from about 1.0 to about 2.5 pounds per acre per application during the stage of growth when said plants have four to six trifoliate leaves expanded.

9. The method in accordance with claim 2 wherein said crop is corn and said ethylene is introduced into the soil during the stage of growth ranging from about the sixth to about the 12th leaf stage.

10. The method in accordance with claim 9 wherein said ethylene is introduced into the soil at a distance of from about 8 to about 20 inches from the crop row and at a depth of from about 6 to about 10 inches, said ethylene being introduced in an amount of from about 1.0 to about 2.5 pounds per acre per application during the stage of growth ranging from about the seventh to about the 10th leaf stage.

11. The method in accordance with claim 2 wherein said crop is cotton.

12. The method in accordance with claim 2 wherein said crop is sorghum.

* * * * *